United States Patent [19]

Patterson, Jr.

[11] 4,017,357
[45] Apr. 12, 1977

[54] NUCLEAR CORE INLET FLOW ARRANGEMENT

[75] Inventor: John F. Patterson, Jr., Murrysville, Pa.

[73] Assignee: Westinghouse Electric Corporation, Pittsburgh, Pa.

[22] Filed: July 31, 1974

[21] Appl. No.: 493,372

Related U.S. Application Data

[63] Continuation of Ser. No. 262,434, June 13, 1972, now Defensive Publication No. T909,019.

[52] U.S. Cl. ............................... 176/61; 176/65
[51] Int. Cl.² ........................................ G21C 15/24
[58] Field of Search ............... 176/50, 61, 59, 65

[56] References Cited

UNITED STATES PATENTS

| | | | |
|---|---|---|---|
| 3,151,029 | 9/1964 | Schwoerer | 176/61 X |
| 3,154,471 | 10/1964 | Radkowsky | 176/61 X |
| 3,281,326 | 10/1966 | Hargo | 176/61 X |
| 3,311,540 | 3/1967 | Tower et al. | 176/61 X |
| 3,501,377 | 3/1970 | Germer | 176/50 X |
| 3,549,493 | 12/1970 | Germer | 176/61 X |
| 3,666,624 | 5/1972 | Finch et al. | 176/50 |
| 3,687,804 | 8/1972 | Mills et al. | 176/50 |
| 3,839,150 | 10/1974 | Porter | 176/61 X |
| 3,892,625 | 7/1975 | Patterson | 176/50 |

*Primary Examiner*—Samuel W. Engle
*Assistant Examiner*—Peter A. Nelson
*Attorney, Agent, or Firm*—Z. L. Dermer; D. C. Abeles

[57] ABSTRACT

A nuclear core arrangement for admitting reactor coolant into nuclear reactor fuel assemblies. Inlet nozzles having main and alternate inlets are attached to the fuel assemblies. Each of the nozzle inlets receive reactor coolant from a separate flow plenum. The flow plenums are arranged in parallel and are separated by a perforated sealing member. Should the main inlet to the fuel assembly become clogged by debris, the alternate inlet supplies the fuel assembly with reactor coolant.

2 Claims, 3 Drawing Figures

FIG. 2

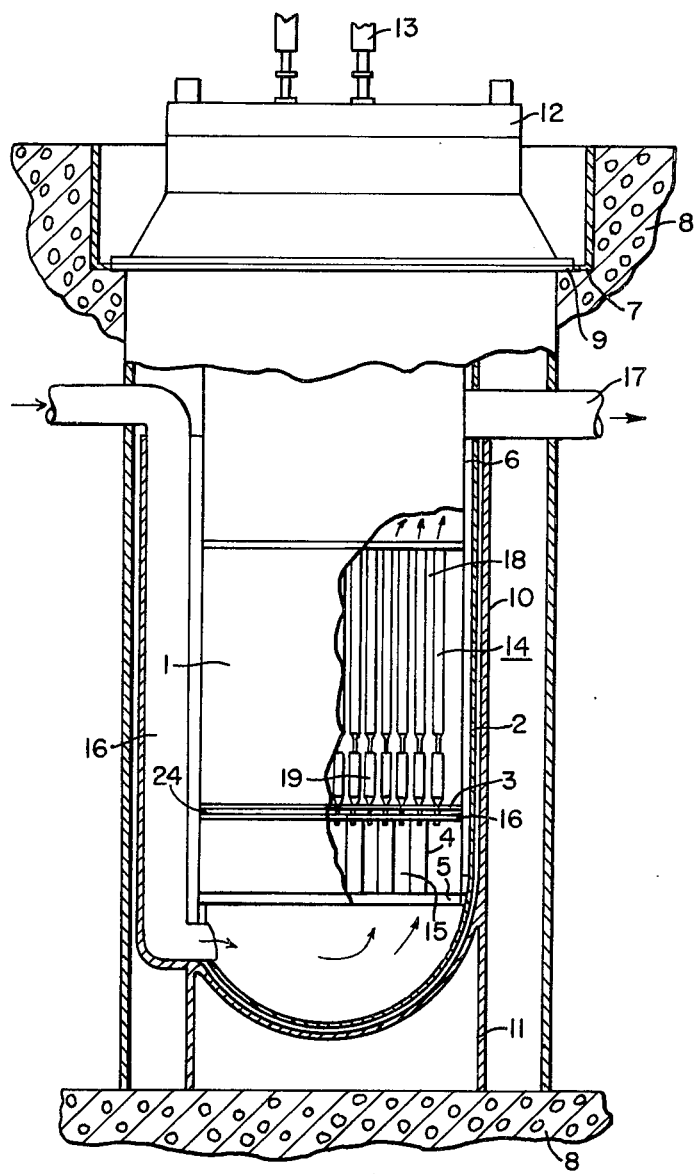
FIG. 1
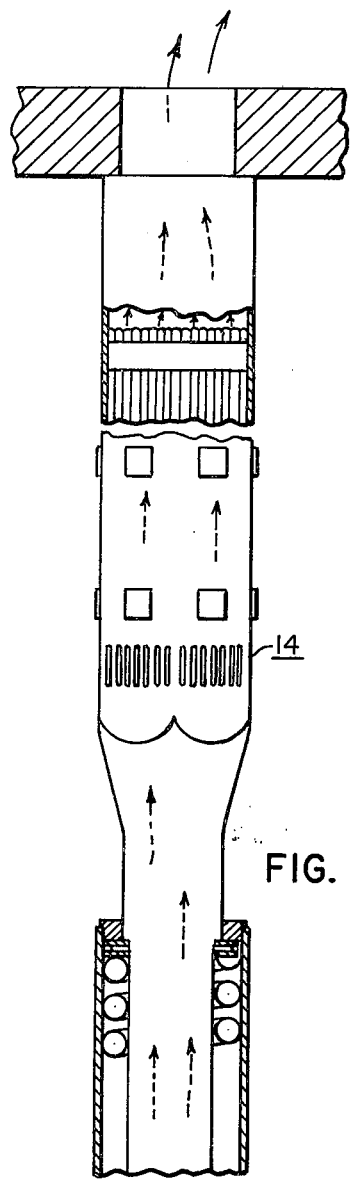
FIG. 2
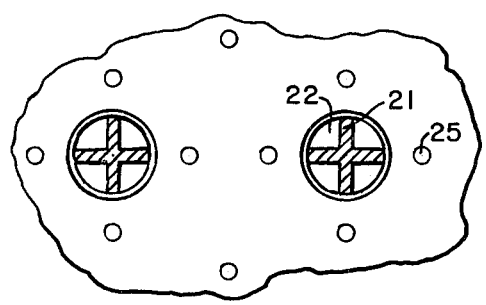
FIG. 3
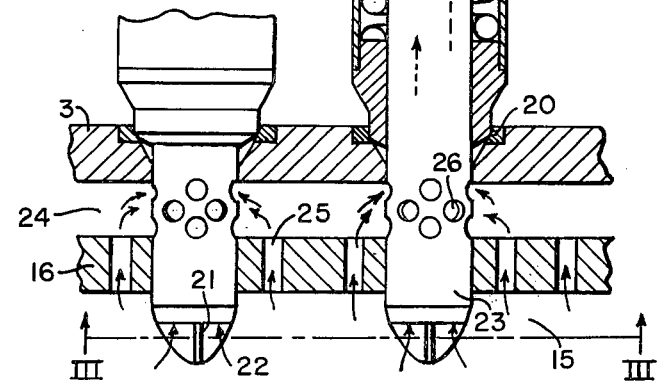

NUCLEAR CORE INLET FLOW ARRANGEMENT

This is a continuation, of application Ser. No. 262,434 filed June 13, 1972, now Defensive Publication No. T909,019, published April 17, 1973 in 909 O.G. 795.

BACKGROUND OF THE INVENTION

1. Field of the Invention:

This invention relates generally to nuclear reactor and more particularly to a nuclear core inlet flow arrangement of a liquid metal-cooled fast breeder nuclear reactor.

2. Description of the Prior Art:

A nuclear core of a liquid metal-cooled fast breeder reactor is comprised of a plurality of fuel assemblies. The fuel assemblies contain nuclear fuel, such as plutonium 239 and uranium 238, which undergo nuclear fission and produce heat. The heat produced by the fission process is removed by flowing a reactor coolant, for example liquid sodium, through the nuclear core. This heat is eventually converted into commercial electrical energy by means of conventional steam turbine-generator apparatus.

In the type of nuclear reactor considered herein the fuel assemblies are made up of fuel rods arranged on a triangular pitch. A plurality of fuel rods thus arranged are contained within a hexagonal enclosure which serves as a flow barrier. The hexagonal enclosure or flow barrier prevents the reactor coolant flow, which is internal to the fuel assemblies, from flowing between different fuel assemblies. Nuclear cores using this reactor coolant flow arrangement are designated as closed cores. By way of contrast, most pressurized water reactors use an open core arrangement which does not allow reactor coolant to flow between the different fuel assemblies.

A number of advantages are gained from the use of a closed core in a nuclear reactor. First, a significant improvement in reactor performance is realized. Second, it enhances the structural integrity of the nuclear core by reducing the probability of failure propagation between fuel assemblies. Unfortunately, a number of disadvantages also result from the use of a closed core. One major disadvantage is that the enclosed fuel assembly is susceptible to overheating failures caused by a loss of reactor coolant flow due to debris blockage. In the prior art, guard structures, similar to grids, are provided at the flow inlets of the fuel assemblies to prevent loss of coolant failures. The guard structures limit the size of foreign objects which can enter the fuel assembly such that the subsequent flow blockage within the fuel assembly does not cause flow starvation. That is, that even with the blockage, an adequate quantity of reactor coolant flows through the fuel assembly to sufficiently cool the fuel assembly. However, the guard structures themselves may become blocked by specially shaped, resilient or flexible foreign objects and cause flow starvation. The present invention overcomes the possibility of core damage due to the susceptibility to flow blockage of the prior art by providing an inlet flow system which is virtually insensitive to flow blockage.

SUMMARY OF THE INVENTION

In this invention, a hollow, cylindrically shaped inlet nozzle is attached to a fuel assembly. The unattached end of the inlet nozzle is open to allow reactor coolant to enter the fuel assembly. As in the prior art, this main reactor coolant inlet is protected by a grid type of guard structure. The end of the inlet nozzle containing the guard structure is immersed in a pool of reactor coolant comprising a main flow plenum which supplies the fuel assembly with reactor coolant.

The inlet nozzle of the invention is provided with an alternate flow inlet consisting of a plurality of holes in the cylindrical surface of the nozzle. The alternate flow inlet is opened to a second pool of reactor coolant comprising an alternate reactor coolant flow plenum. The main and alternate flow plenums are physically separated by a plate which acts as a sealing member. The sealing member is perforated by a plurality of small diameter holes which permit reactor coolant flow communication between the two plenums. The holes in the sealing plate are the size similar to the size of the openings in the guard structure. Thus, if the main reactor coolant inlet becomes clogged by a large foreign object, the fuel assembly received an adequate supply of reactor coolant through the flow path comprising the alternate inlet and the alternate flow plenum. Further, since the sealing plate prevents passage of large foreign objects, the fuel assembly is still provided with adequate protection against internal flow blockage. In this manner, the present invention protects the fuel assembly from damage caused by flow starvation resulting from either internal flow blockage or inlet flow blockage.

BRIEF DESCRIPTION OF THE DRAWINGS

Other advantages of the invention will be apparent from the following detailed description taken in consideration with the accompanying drawings, in which:

FIG. 1 is a vertical cross sectional view of one form of a nuclear reactor to which this invention may be applied;

FIG. 2 is an enlarged foreshortened sectional view of a fuel assembly of a nuclear core with an inlet flow arrangement as provided by this invention; and FIG. 3 is a plan view of a guard structure of an inlet nozzle of a fuel assembly.

DESCRIPTION OF THE PREFERRED EMBODIMENTS

Throughout the description which follows, like reference characters indicate like elements in the various figures of the drawings.

Referring now more particularly to FIG. 1 of the drawings, the nuclear reactor depicted therein, is a liquid metal-cooled fast breeder nuclear reactor. A nuclear core 1 is contained within a pressure vessel 2. The nuclear core 1 is axially supported by a lower core plate 3 which in turn is supported by columns 4 attached to a lower support structure 5. The load from the lower support structure 5 is transferred to a core barrel 6 and ultimately to a support ledge 7 in a reactor vessel vault 8 by a pressure vessel flange 9.

A guard vessel 10 surrounds the lower portion of the reactor pressure vessel 2. The guard vessel 10 serves to prevent reactor coolant comprising liquid sodium, from dropping below a level required for maintaining emergency core cooling in the unlikely event of a reactor pressure vessel 2 leak or pipe rupture. The guard vessel 10 is supported by a bottom skirt 11 which rests on the floor of the reactor vessel vault 8.

The upper end of the reactor pressure vessel 2 is hermetically sealed by a removable closure head upon which are mounted a plurality of control rod drive mechanisms 13. FIG. 1 only shows two such rod drive mechanisms 13 for purposes of simplicity. Each rod drive mechanism 13 is connected to a control rod assembly (not shown) which penetrates the reactor pressure vessel 2 and extends into the nuclear core 1. The control rods function to increase or decrease the output power of the nuclear reactor and to shut down the nuclear reactor.

The nuclear core 1 is comprised of a plurality of fuel assemblies 14 containing nuclear fuel. In a fast breeder nuclear reactor, the nuclear fuel primarily consists of fissile plutonium 239 and uranium 238 which is both fissile and fertile. During reactor operation, the fissile fuels undergo nuclear fission and produce heat which is eventually converted to electrical energy. The fertile uranium 238 captures an excess neutron during reactor operation and is converted to plutonium 239 which later may be used as fuel in another nuclear core.

The heat produced by fission of the nuclear fuel is removed by flowing a reactor coolant comprising liquid sodium, through the nuclear core 1. The reactor coolant gains entrance to the reactor pressure vessel 2 containing the nuclear core 1 by way of an inlet pipe 16, attached to the bottom of the reactor pressure vessel 2. Within the reactor pressure vessel 2, the reactor coolant flows up through the lower support structure 5 into a reactor coolant main flow plenum 15. The reactor coolant main flow plenum 15 comprises a region bounded by the lower support structure 5 and a perforated sealing plate 16. The bottom or reactor coolant main inlet end of the fuel assemblies 14 extend into the main flow plenum 15. The reactor coolant flows from the main flow plenum 15 into the fuel assemblies 14. Within the fuel assemblies 14, the heat produced by nuclear fission is transferred from the fuel assemblies 14 to the reactor coolant flowing therein. The hot reactor coolant exits the nuclear core 1 comprising the plurality of fuel assemblies 14 and flows out of the reactor pressure vessel 2 through an outlet pipe 17. The hot reactor coolant then flows to an intermediate heat exchanger (not shown) where it retransfers its previously acquired heat and is then pumped back into the reactor pressure vessel 2 where the above described flow cycle is repeated.

The reactor coolant main flow plenum 15 is a conventional and highly desirable feature of the nuclear reactor. Its purpose is to stagnate the reactor coolant flow so that the inlet flow condition of the reactor coolant is the same for each fuel assembly 14. Similar inlet flow conditions are required for predictable fuel assembly performance and optimization of overall reactor performance. The main plenum flow 15 operates by reducing vortexing and other turbulence by distributing flow evenly in the inlet region of the core. This is partially accomplished by making the cross sectional flow area of the main flow plenum 15 large in relation to that of the inlet pipe 16. The relative size of these two items is seen in FIG. 1.

As mentioned above, reactor coolant flow is internal to the fuel assemblies 14 for the purposes of increased reactor performance. Therefore, reactor coolant flow which is exterior to the fuel assemblies 14 decreases reactor performance and is undesirable. The power reduction is caused by the external flow not being heated to reactor operating temperatures which lowers the overall temperature rise of the total reactor coolant flowing through the nuclear core 1. To prevent reactor coolant flow external to the fuel assemblies 14, a core bypass flow seal 19 is used. The lower end of each fuel assembly is sealed by the core bypass flow seal 19. The core bypass flow seal 19 is spring loaded to adjust for fuel assembly 14 growth during reactor operation. The flow seal 19 seals by contacting hardened inserts 20 provided in the lower core plate 3 as shown in FIG. 2.

A grid type of guard structure 21 is provided in an opening 22 comprising the main inlet for the reactor coolant flow entering the fuel assembly 14. The guard structure 21 is a protective device limiting the size of a foreign object which may enter and clog the fuel assembly 14 such that the resulting reactor coolant flow through the fuel assembly 14 is still adequate to prevent overheating of the fuel assembly 14. FIG. 3 shows a view of a type of opening 22 and a guard structure 21, looking in the direction of the reactor coolant flow. Even with the guard structure 21, there remains the possibility of insufficient reactor coolant flow through the fuel assembly 14 by clogging of the guard structure 21 itself. The guard structure 21 can become clogged by specially shaped flexible foreign objects such as a piece of soft plastic film, a workman's glove, a rag or other like objects. The present invention eliminates any problem caused by clogging of the fuel assembly main inlet 22.

As shown in FIG. 2, the lower end of the fuel assembly 14 contains an inlet nozzle 23 for the reactor coolant flow entering the fuel assembly 14. The main inlet 22 and the guard structure 21 form part of the inlet nozzle 23. Most often, the inlet nozzle 23 is a cylindrical tube or pipe attached, such as by welding, to the reactor coolant inlet end of the fuel assembly 14. As mentioned above, the opening 22 comprising the main inlet of the inlet nozzle 23, is immersed in the main flow plenum 15 which contains reactor coolant. The fuel assembly 14 is supplied with reactor coolant primarily from the main flow plenum 15. In addition to this function, the main flow plenum 15 also supplies an alternate flow plenum 24 with reactor coolant. The alternate flow plenum 24 supplies the fuel assembly 14 with an alternate source of reactor coolant in the event the flow from the main flow plenum 15 is interrupted.

The alternate flow plenum 24 comprises a region bounded by the lower core plate 3 and the perforated sealing plate 16. The main flow plenum 15 is separated from the alternate flow plenum 24 by the perforated sealing plate 16. Perforations 25 in the perforated sealing plate 16 provide flow communication between the two flow plenums 15 and 24. An alternate reactor coolant inlet 26, such as circular perforations, in the cylindrical portion of the inlet nozzle 23 is open to the alternate flow plenum 24. The perforated sealing plate also separates the main inlet 22 from the alternate inlet 26 of the inlet nozzle 23. The flow channel comprising the inside diameter of the inlet nozzle 23 is common to the main and alternate inlets 22 and 26, respectively. Thus, the inlet nozzle 23 and consequently the fuel assembly 14 are open to both flow plenums 15 and 24. The flow path consisting of the main flow plenum 15, the main inlet 22 and the inside diameter of the inlet nozzle 23 comprises the main inlet flow path for the flow of reactor coolant into the fuel assembly 14. The flow path consisting of the alternate flow plenum 24, the alternate inlet 26 and the inside diameter of the inlet nozzle 23 comprises the alternate inlet flow path for the flow of reactor coolant into the fuel assembly 14. The fuel assembly 14 is therefore provided with a redundant reactor coolant inlet flow path. If the main inlet flow path becomes clogged, by a specially shaped flexible foreign object, the fuel assembly is supplied with an adequate quantity of reactor coolant through the alternate flow path.

The perforations 25 in the perforated sealing plate 16 are a size smaller than the size of the openings 22 in a guard structure 21 of the inlet nozzle 23. The perforations 25 then, will not allow passage of the specially shaped flexible foreign objects which can clog the main inlet 22. Further, since the number of perforations 25 is large, it is highly improbable that the perforated sealing plate 16 can become clogged regardless of the size or shape of foreign objects.

From the foregoing description, taken in connection with the drawings, it is seen that this invention provides an inlet flow arrangement for a nuclear core of a nuclear reactor which is virtually insensitive to flow blockage thereby eliminating the susceptibility of a nuclear core comprising enclosed fuel assemblies from overheating failures caused by a loss of reactor coolant flow due to debris blockage.

Since numerous changes may be made in the above described apparatus, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A nuclear core inlet flow arrangement for a nuclear reactor, said nuclear core comprising, in combination, a plurality of fuel assemblies including fissile material for generating heat by nuclear fission, inlet flow means for admitting reactor coolant into said nuclear core, said reactor coolant serving to remove said generated heat from said nuclear core, said inlet flow means comprising a plurality of seperate plenum flow regions, plurality of inlet flow nozzles respectively communicating with a corresponding one of said plurality of fuel assemblies for admitting and directing said reactor coolant into and through said corresponding fuel assemblies, each of said inlet flow nozzles having a plurality of parallel inlet flow path means with the respective corresponding flow path means of said plurality of nozzles in fluid communication with a corresponding one of a plurality of separate plenum flow regions from which said reactor coolant is drawn into said nuclear core for assuring the existence of an inlet flow path for said reactor coolant into said nuclear core, said plurality of parallel inlet flow path means associated with each of said nozzles being connected by a common flow channel comprising the interior of said corresponding inlet flow nozzle and an outlet means for exiting said reactor coolant from said nuclear core.

2. The system of claim 1 wheerein said plurality of plenum flow regions comprises a main flow region for supplying a first of said inlet flow path means with reactor coolant and an alternate flow plenum region for supplying a second of said inlet flow path means with said reactor coolant, said plenum flow regions being flow connected but physically separated by a perforated sealing member, said perforated sealing member having perforated openings sized to permit flow of said reactor coolant between said plenum flow regions but prevent passage of foreign objects which may block said second of said inlet flow path means.

* * * * *